May 14, 1935.  D. COHEN  2,001,524
ATTACHMENT FOR MEAT GRINDING MACHINES
Filed Feb. 12, 1934
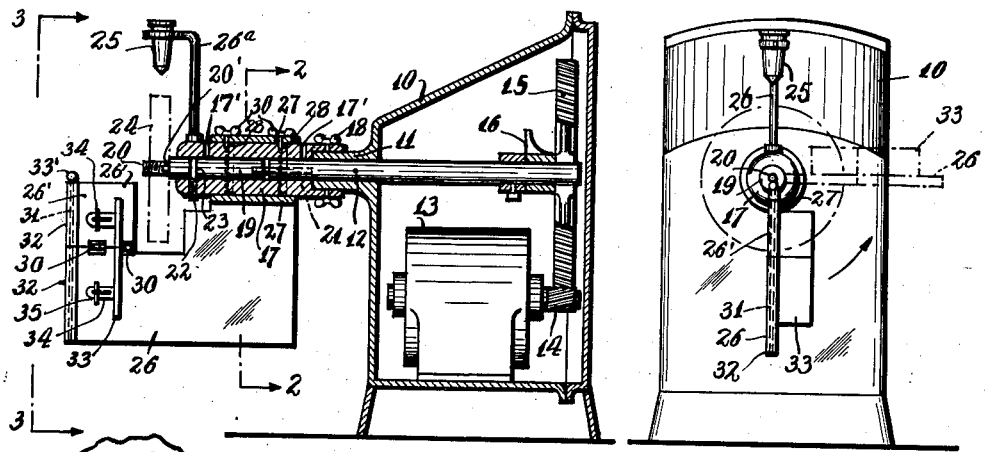
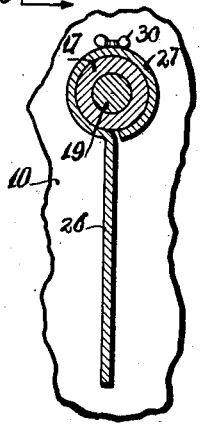
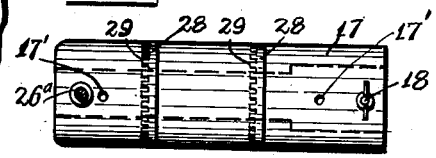
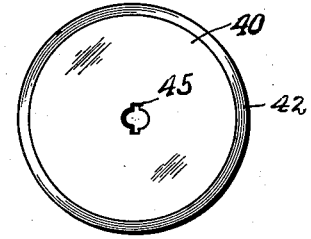
Fig. 1.
Fig. 3.
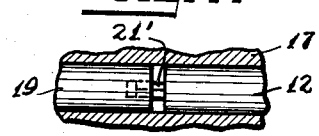
Fig. 2.  Fig. 4.  Fig. 5.  Fig. 6.
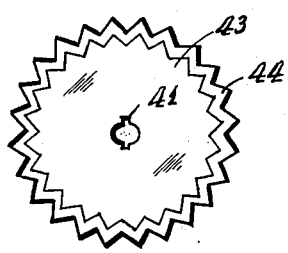
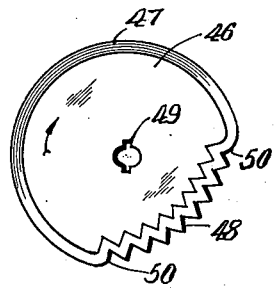
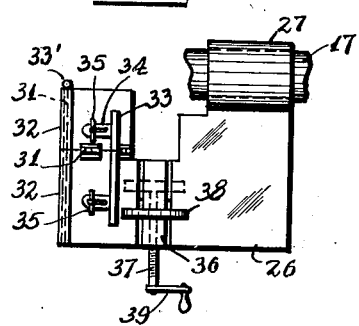
Fig. 7.  Fig. 8.  Fig. 9.
INVENTOR
David Cohen
BY
ATTORNEY Patented May 14, 1935

2,001,524

UNITED STATES PATENT OFFICE 2,001,524

ATTACHMENT FOR MEAT GRINDING MACHINES

David Cohen, New York, N. Y.

Application February 12, 1934, Serial No. 710,765

11 Claims. (Cl. 146—77)

This invention relates to new and useful improvements in an attachment for meat grinding machine.

The invention has for an object the provision of an attachment which is adapted to be used to cut meat and saw bones.

A still further object of this invention is the provision of a tubular member for attachment upon the body of the grinding machine axially with the drive shaft, after the grinding portion of the machine has been removed, and mechanism associated with said tubular member constituting an attachment for cutting and sawing.

Furthermore as another object of this invention it is proposed to provide a platform having a tubular portion rotatively engaged upon said tubular member and an arrangement for holding said platform in various positions so that it may be used when desired.

Still further the invention proposes the provision of a shaft rotative within the tubular member and having one end projecting and adapted to be connected with a tool such as a cutting wheel or cutting saw, and at its other end provided with an arrangement for being coupled to the drive shaft of said grinding machine.

Still further the invention proposes the construction of an attachment as mentioned which is simple and durable and which may be manufactured and sold at a reasonable cost.

For further comprehension of the invention, and of the objects and advantages thereof, reference will be had to the following description and accompanying drawing, and to the appended claims in which the various novel features are more particularly set forth.

In the accompanying drawing forming a material part of this invention.

Fig. 1 is a vertical sectional view of an attachment according to this invention shown upon a portion of a grinding machine.

Fig. 2 is a sectional view taken on the line 2—2 of Fig. 1.

Fig. 3 is an end elevational view looking in the direction of the line 3—3 of Fig. 1.

Fig. 4 is a side elevational view of the tubular member per se, used in the attachment.

Fig. 5 is a fragmentary view similar to a portion of Fig. 1 but illustrating a different type of coupling between the drive shaft and the shaft of the attachment.

Fig. 6 is a side elevational view of a cutting wheel to be used with the attachment.

Fig. 7 is a side elevational view of a sawing wheel to be used with the attachment.

Fig. 8 is a side elevational view of a combination cutting and sawing wheel to be used with the attachment.

Fig. 9 is a view similar to a portion of Fig. 1, illustrating a platform in particular, but constructed according to a modified form.

The attachment according to this invention is used in conjunction with a grinding machine having a casing 10 formed with a tubular portion 11 through which the drive shaft 12 extends. The grinding portion of the machine is not shown upon the drawing, but instead the attachment is shown mounted upon the drive portion of the grinding machine. This drive portion includes a motor 13 within the casing 10, and having a pinion 14 upon the shaft, meshing with a gear 15 fixed upon the shaft 12. The shaft 12 is supported at one end with the tubular portion 11 and at the other end with a bearing 16 mounted upon the inner side of the casing 10.

The attachment according to this invention comprises a tubular member 17 for attachment upon the body of the grinding machine axially with the drive shaft 12. More particularly one end of the tubular member 17 is adapted to slip upon the tubular portion 11. Clamp screws 18 engage through the end of the tubular portion 17 against the tubular portion 11 for rigidly attaching the tubular member upon the body of the grinding machine. A shaft 19 is rotatively mounted through the tubular member 17 and has its inner end equipped with a coupling element for connection with the drive shaft 12 and has its outer end equipped with an element 20 for receiving and holding a grinding or cutting tool. The tubular member 17 is provided with holes 17' for oil to lubricate the parts.

The coupling between the shafts 12 and 19 comprises a transverse plate 21 inserted diametrically into the end of the drive shaft 12 and adapted to engage a transverse cut in the end of the shaft 19. In Fig. 5 a modified form of coupling has been disclosed and comprises a square portion 21' from the drive shaft 12 engaging a square opening in the end of the shaft 19. This modified form is shown merely to bring out that any of the generally known types of couplings may be used for engaging the shafts 12 and 19 together provided these couplings are of types that the tubular member may be engaged upon the body of the grinding machine and cause the connection of the coupling elements.

The element 20 for the tool comprises merely a threaded end of the shaft 19 formed with a pair of oppositely arranged radial extensions 20'.

Preferably, these threads should be left handed threads. The shaft 12 should rotate in such direction that there is a tendency for the tool or grinding element engaged thereon to become tighter thereon instead of having any tendency to become displaced.

A pin 22 engages through the tubular member 17 and engages a peripheral groove 23 formed in the shaft 19 so as to restrain the shaft 19 from moving longitudinally while allowing rotation. The dot and dash lines 24 indicate a grinding tool such as a grinding wheel upon the element 20. A small drip container 25 is supported by an arm 26a mounted upon the tubular member 17, so as to be located over the grinding wheel 24 and provide water for cooling purposes. Instead of the grinding wheel 24 different tools such as cutting and sawing tools may be used as hereinafter further described.

A platform 26 having a tubular portion 27 on one edge thereof is associated with the tubular member 17. More particularly the tubular portion 27 is of a diameter to rotatively engage on the tubular member 17 to allow the platform 26 to be moved to various rotative positions. An arrangement is provided to hold the platform 26 in various positions and comprises several peripheral grooves 28 formed upon the tubular member 17 and having small transverse branches 29 closely spaced to each other. Elements project from the tubular portion 27, these elements being shown to comprise screws 30 engaged through the tubular portion 27 so that their inner ends engage the grooves 28. The arrangement is such that the platform 26 may be moved slightly longitudinally to engage the inner ends of the screws 30 into certain of the branches 29 for holding the platform in fixed position. The platform may be moved to a different position by moving the platform longitudinally to disengage the screws 30 from the particular branches, and to move the screws 30 to the portions 28 of the grooves so that the platform may then be rotated. Thereafter the platform may be moved to again assume a fixed position, by a longitudinal motion thereof to cause the screws to engage other of the branches.

The platform 26 is of substantially U-shape, see Fig. 1, and the tubular portion 27 is formed upon one of the ends of the arms thereof. The arms of the U-shaped platform 26 are adapted to straddle the tool or grinding wheel 24 so that material to be worked on may be rested thereon and conveniently engaged against the tool or grinding wheel. An arrangement is provided for moving a portion of one of the arms of the U-shaped platform into a position so that the grinding tool 24 or other element may easily be engaged and disengaged from the holding elements 20.

More particularly the platform 26 is formed with a section 26' connected with the other portion thereof by hinges 30. An arrangement is provided for holding the section 26' in line with the section 26 and comprises a rod 31 engaged through aligned tubular portions 32 upon the edges of the section and the main portion of the platform. The rod 31 is provided with a head 33' by which it may be easily manipulated, that is, engaged and removed from the tubular portions. These tubular portions 32 are formed by bending the end of the platform around into tubular shape. A guiding member 33 is formed with lugs 34 having elongated slots through which holding bolts 35 from the platform engage. These holding bolts 35 are adapted to clamp the guilding member 33 in various adjustable positions. The guiding member 33 is formed from two sections, and extends from the main portion of the platform 26 over the section 26', and is divided at the junction between these sections so that when the section 26' is pivoted one portion of the guiding member will be pivoted correspondingly. The function of the guiding member 33 is to provide a guide against which meat or other material may be moved during the cutting, sawing, or grinding thereof.

In Fig. 9 a slightly modified form of platform has been disclosed which is provided with a standard 36 threadedly supporting the stem 37 having a feeding plate 38 at one end slidably engaging the platform. The stem 37 is rotatively connected with the feeding plate 38 and the arrangement is such that when the stem 37 is rotated the feeding plate 38 will advance forwards or rearwards depending upon the direction of rotation. A handle 39 is mounted upon the front end of the stem 37. The feeding plate 38 is located adjacent the guiding member 33 and in a position so that material may be advanced against the grinding or cutting element mounted upon the element 20.

In Fig. 6 a meat cutting knife 40 has been illustrated which is adapted to be mounted upon the holding element 20. At the center the knife 40 is formed with a keyway opening 41 to engage the radial extensions 20' of element 20, and is held thereon by nuts or the like. The periphery of the knife 40 is formed with a straight sharpening edge 42. This knife may be of any desired thickness, depending merely upon the proportion of the parts.

In Fig. 7 another tool has been shown for the attachment and comprises a disc 43 with saw teeth 44 on the periphery thereof, and at the center is provided with a keyway opening 45. This tool is adapted to be engaged upon the supporting element 20 and is adapted to cut the bones of meat by a sawing action.

In Fig. 8 another type of tool has been disclosed and comprises a flat disc 46 having a peripheral portion 47 which is straight and sharpened as a knife, and another portion 48 thereof which is formed with saw teeth. The saw teeth 48 are arranged upon a smaller diameter to the knife 47. The central portion of the disc is formed with a keyway opening 49. The construction is such that normally during the rotation of the disc the knife portion 47 thereof will cut meat or other material which is adapted to be cut. In the event that a bone is reached then as the meat with the bone or the bone itself is forced against the cutting tool it will move inwards and be engaged by the teeth 48 so as to be sawed. The portions 47 and 48 are connected with smooth curved portions 50 acting as cams so that the bones or meat may be automatically forced from one to the other of the portions of the cutting tool during the rotation thereof when manually pressed against the tool.

It is to be understood that the tool may be held on member 20 in any suitable manner either by securing the tool directly on the threaded member 20 or by the use of any securing and clamping arrangement generally known. It is also to be understood that the feeding plate 38 may be moved by hand instead of by the threaded stem 37.

While I have illustrated and described the preferred embodiment of my invention it is to be understood that I do not limit myself to the precise construction herein disclosed and the right is reserved to all changes and modifications coming within the scope of the invention as defined in the appended claims.

Having thus described my invention, what I claim as new and desire to secure by United States Letters Patent is:—

1. An attachment for a meat grinding machine, comprising a tubular member for attachment on the body of the grinding machine axially with the drive shaft, a shaft rotative through said tubular member and having its inner end equipped with a coupling element for connection with said drive shaft and having its outer end equipped with an element for receiving and holding a tool, a platform having a tubular portion on one edge thereof engaging said tubular member and means for holding said tubular portions in various fixed positions for holding the platform in various working or inoperative positions.

2. An attachment for a meat grinding machine, comprising a tubular member for attachment on the body of the grinding machine axially with the drive shaft, a shaft rotative through said tubular member and having its inner end equipped with a coupling element for connection with said drive shaft and having its outer end equipped with an element for receiving and holding a tool, a platform having a tubular portion on one edge thereof engaging said tubular member, and means for holding said tubular portions in various fixed positions for holding the platform in various or inoperative positions, clamping screws threadedly engaging said tubular member for engaging against the body of the grinding machine to clamp the tubular member in position.

3. An attachment for a meat grinding machine, comprising a tubular member for attachment on the body of the grinding machine axially with the drive shaft, a shaft rotative through said tubular member and having its inner end equipped with a coupling element for connection with said drive shaft and having its outer end equipped with an element for receiving and holding a tool, a platform having a tubular portion on one edge thereof engaging said tubular member and means for holding said tubular portions in various fixed positions for holding the platform in various working or inoperative positions, and cooperative means between said rotative shaft in the tubular member for restraining the shaft from moving in the longitudinal direction.

4. An attachment for a meat grinding machine, comprising a tubular member for attachment on the body of the grinding machine axially with the drive shaft, a shaft rotative through said tubular member and having its inner end equipped with a coupling element for connection with said drive shaft and having its outer end equipped with an element for receiving and holding a tool, a platform having a tubular portion on one edge thereof engaging over said tubular member, and means for holding said tubular portions in various fixed positions for holding the platform in various working or inoperatife positions, comprising peripheral grooves with short right angle branches formed upon the inner tubular member, and elements upon the tubular portion engaging said grooves and engageable selectively with said right angle branches upon slight longitudinal motion of the platform and tubular portion.

5. An attachment for a meat grinding machine, comprising a tubular member for attachment on the body of the grinding machine axially with the drive shaft, a shaft rotative through said tubular member and having its inner end equipped with a coupling element for connection with said drive shaft and having its outer end equipped with an element for receiving and holding a tool, a platform having a tubular portion on one edge thereof engaging said tubular member, and means for holding said tubular portions in various fixed positions for holding the platform in various working or inoperative positions, said platform being of U-shape for engaging around a tool or grinding element mounted upon the outer end of said shaft.

6. An attachment for a meat grinding machine, comprising a tubular member for attachment on the body of the grinding machine axially with the drive shaft, a shaft rotative through said tubular member and having its inner end equipped with a coupling element for connection with said drive shaft and having its outer end equipped with an element for receiving and holding a tool, a platform having a tubular portion on one edge thereof engaging said tubular member and means for holding said tubular portions in various fixed positions for holding the platform in various working or inoperative positions, said platform being of U-shape for engaging around a tool or grinding element mounted upon the outer end of said shaft, one arm of said U-shaped platform having a hingedly mounted portion adapted to swing out of position to allow the placing and removal of tools upon the end of said shaft.

7. An attachment for a meat grinding machine, comprising a tubular member for attachment on the body of the grinding machine axially with the drive shaft, a shaft rotative through said tubular member and having its inner end equipped with a coupling element for connection with said drive shaft and having its outer end equipped with an element for receiving and holding a tool, a platform having a tubular portion on one edge thereof engaging said tubular member, and means for holding said tubular portions in various fixed positions for holding the platform in various working or inoperative positions, said platform being of U-shape for engaging around a tool or grinding element mounted upon the outer end of said shaft, one arm of said U-shaped platform having a hingedly mounted portion adapted to swing out of position to allow the placing and removal of tools upon the end of said shaft, and means for holding a section of said platform in aligned position.

8. An attachment for a meat grinding machine, comprising a tubular member for attachment on the body of the grinding machine axially with the drive shaft, a shaft rotative through said tubular member and having its inner end equipped with a coupling element for connection with said drive shaft and having its outer end equipped with an element for receiving and holding a tool, a platform having a tubular portion on one edge thereof engaging said tubular member, and means for holding said tubular portions in various fixed positions for holding the platform in various working or inoperative positions, said platform being of U-shape for engaging around a tool or grinding element mounted upon the outer end of said shaft, one arm of said U-shape platform having a hingedly mounted portion adapted to swing out of position to allow the placing and removal of tools upon the end of said shaft, and means for holding said hingedly mounted portion in a common plane with said platform, comprising aligned tubular portions upon the hingedly mounted portion and the platform and a rod engaged through said tubular portions.

9. An attachment for a meat grinding machine, comprising a tubular member for attachment on the body of the grinding machine axially with the drive shaft, a shaft rotative through said tubular member and having its inner end equipped with a coupling element for connection with said drive shaft and having its outer end equipped with an element for receiving and holding a tool, a platform having a tubular portion on one edge thereof engaging said tubular member and means for holding said tubular portions in various fixed positions for holding the platform in various working or inoperative positions, said platform being of U-shape for engaging around a tool or grinding element mounted upon the outer end of said shaft, one arm of said U-shaped platform having a hingedly mounted portion adapted to swing out of position to allow the placing of tools upon the end of said shaft, and means for holding said hingedly mounted portion in a common plane with said platform, comprising aligned tubular portions upon the hingedly mounted portion and the platform and a rod engaged through said tubular portions, and a guide for meat mounting upon the platform having a portion extending over said hinged section.

10. An attachment for a meat grinding machine, comprising a tubular member for attachment on the body of the grinding machine axially with the drive shaft, a shaft rotative through said tubular member and having its inner end equipped with a coupling element for connection with said drive shaft and having its outer end equipped with an element for receiving and holding a tool, a platform having a tubular portion on one edge thereof engaging said tubular member, and means for holding said tubular portions in various fixed positions for holding the platform in various working or inoperative positions, said platform being of U-shape for engaging around a tool or grinding element mounted upon the outer end of said shaft, one arm of said U-shaped platform having a hingedly mounted portion adapted to swing out of position to allow the placing and removal of tools upon the end of said shaft, and means for holding said hingedly mounted portion in a common plane with said platform, comprising aligned tubular portions upon the hingedly mounted portion and the platform and a rod engaged through said tubular portions, and a guide for meat mounting upon the platform having a portion extending over said hinged section, and each of the portions of the guide member being adjustably mounted upon the platform.

11. An attachment for a meat grinding machine, comprising a tubular member for attachment on the body of the grinding machine axially with the drive shaft, a shaft rotative through said tubular member and having its inner end equipped with a coupling element for connection with said drive shaft and having its outer end equipped with an element for receiving and holding a tool, a platform having a tubular portion on one edge thereof engaging said tubular member, and means for holding said tubular portions in various fixed positions for holding the platform in various working or inoperative positions, said platform being of U-shape for engaging around a tool or grinding element mounted upon the outer end of said shaft, one arm of said U-shaped platform having a hingedly mounted portion adapted to swing out of position to allow the placing and removal of tools upon the end of said shaft, and means for holding said hingedly mounted portion in a common plane with said platform, comprising aligned tubular portions upon the hingedly mounted portion and the platform and a rod engaged through said tubular portions, and a guide for meat mounting upon the platform having a portion extending over said hinged section, and each of the portions of the guide member being adjustably mounted upon the platform, and a feeding mechanism upon said platform.

DAVID COHEN.